United States Patent [19]
Kagiya et al.

[11] 3,857,768
[45] Dec. 31, 1974

[54] PROCESS FOR RADIATION CROSS-LINKING POLYMETHYL ACRYLATE-METHYL ACRYLATE COMPOSITIONS

[75] Inventors: Tsutomu Kagiya, Kyoto; Hiroshi Mitsui, Takasaki; Kazuyoshi Tsuneta, Takasaki; Hiroshi Mihara, Takasaki, all of Japan

[73] Assignee: Ube Industries, Ltd., Ube-shi, Yamaguchi-ken, Japan

[22] Filed: Nov. 15, 1972

[21] Appl. No.: 306,855

Related U.S. Application Data

[63] Continuation of Ser. No. 83,594, Oct. 23, 1970, abandoned.

[30] Foreign Application Priority Data
Oct. 28, 1969 Japan.............................. 44-85664
Dec. 6, 1969 Japan.............................. 44-97674

[52] U.S. Cl...... 204/159.16, 117/93.31, 117/132 R, 204/159.15, 260/89.5 A, 260/881, 260/885
[51] Int. Cl........................... C08d 1/00, C08f 1/00
[58] Field of Search..... 204/159.15, 159.16, 159.23; 260/89.5 A

[56] References Cited
UNITED STATES PATENTS
2,413,973  1/1947  Howk et al. ................... 204/159.12
2,921,006  1/1960  Schmitz et al. ................ 204/159.15

Primary Examiner—Murray Tillman
Assistant Examiner—Richard B. Turer
Attorney, Agent, or Firm—Toren and McGeady

[57] ABSTRACT

A monomer, necessarily containing methyl acrylate, is dissolved in or swelled with polymethyl acrylate to produce resin compositions that is capable of readily cross-linking under irradiation of ionizing radiation or ultraviolet rays. They are useful for making, among others, coatings, adhesives, and resin formers.

13 Claims, No Drawings

PROCESS FOR RADIATION CROSS-LINKING POLYMETHYL ACRYLATE-METHYL ACRYLATE COMPOSITIONS

This is a continuation of application Ser. No. 83,594 filed Oct. 23, 1970.

SUMMARY OF THE INVENTION

This invention relates to resin compositions which are cross-linkable.

It is the object of the invention to provide resin compositions in the liquid state, suitable for material as coatings, adhesives and resin formers, which are capable of cross-linking upon treatment by irradiation of ionizing radiation or ultraviolet rays.

Studies have been made as to a method for polymerizing under irradiation of ionizing radiation or ultraviolet rays a liquid resin composition consisting of a mixture of unsaturated polyester and vinyl monomer, the vinyl monomer being, for example, sytrene or vinyl acetate. However, no satisfactory results have been reported.

The inventors, during their researches on the polymerization reactions under irradiation of ionizing radiation of vinyl monomers; such as esters of acrylic acid and methacrylic acid, styrene, and vinyl acetate, have discovered that there exists a monomer, such as methyl acrylate, which is polymerizable with a higher rate under irradiation of ionizing radiation and is capable of forming a polymer, insoluble in solvents.

This liquid monomer was, however, unsuitable for, for example, coatings and adhesives, if applied alone, because of its viscosity being too low for uniform application, and, moreover, it was subjected to a great loss of its mass during the course of curing. In order to remove these draw-backs and also to increase the curing rate, the inventors continued studies on how a resin composition which contains one of various vinyl resins mixed and dissolved or swelled in one of the various liquid vinyl monomers would be affected by irradiation of ionizing radiation. As a result, it was found that a resin composition consisting of a methyl acrylate resin dissolved in methyl acrylate was cross-linked at a remarkably high rate. Further studies of the inventors on the mechanism of the cross-linking polymerization reactions concerned have lead to the discovery that the same resin composition can be cross-linked by irradiation of ultraviolet rays similarly with an increased rate. The invention has, thus, been accomplished.

The present invention is characterized in establishing cross-links in a resin composition substantially consisting of a monomer having as at least one of its components methyl acrylate selected from the group consisting of methyl acrylate and the other vinyl monomers, and a methyl acrylate-type resin (polymethyl acrylate) dissolved or swelled in the monomer, such cross-linking being carried out in the presence of ionizing radiation or ultraviolet rays.

The mechanism of the present invention may be said to make cross-linking accelerated by the interaction of the methyl acrylate and the radicals formed in the methyl acrylate resin under irradiation of ionizing radiation or ultraviolet rays, though it has not been definitely affirmed.

According to the invention, the resin compositions are readily cross-linked in the presence of a very small dose of ionizing radiation or a very small amount of ultraviolet rays, with a minimum loss of the monomer charge incurred during the process, and with remarkable improvements in chemical and physical properties such as solvent resistance and thermal resistance and mechanical properties.

By the term "cross-linking polymerization" as used herein is meant a polymerization reaction which occurs to the monomers in the resin composition, simultaneously establishing cross-links between the molecules of the high-molecular-weight polymer in the same resin composition and the high-molecular-weight polymer in the newly formed system.

"Methyl acrylate resin" as used herein means a high-molecular-weight polymer, having the methyl acrylate unit in the molecule of itself or its mixture with other high-molecular-weight polymer or polymers; the methyl acrylate unit being in the amount of not less than 1 mol percent, preferably 10 mol percent or more. The methyl acrylate resins are exemplified by methyl acrylate polymer, copolymer of methyl acrylate and one or more other polymerizable monomers, polymethyl acrylate obtained by graft polymerization of one or more polymerizable monomers other than methyl acrylate.

The methyl acrylate which is a component of the resin composition serving to increase the rate of cross-linking polymerization according to the present invention, may be used, mixed with a vinyl monomer, polymerizable by itself or copolymerizable with methyl acrylate in the presence of ionizing radiation or ultraviolet rays, depending upon the properties of the methyl acrylate resin to be employed, the method and proportion of mixing and dissolving the resin, the method and conditions of irradiation, the purpose of cross-linking polymerization, the degree of the polymerization desired, and economic factors concerned.

Typical vinyl monomers may be exemplified by vinyl acetate, low alkyl acrylate such as ethyl, low alkyl methacrylate, and acrylonitrile.

According to the present invention, the methyl acrylate resin is necessarily, uniformly mixed and dissolved or sufficiently swelled in methyl acrylate; however, the mixing and dissolving or swelling methods are not particularly limited, but determined, preferably, in consideration of the properties of methyl acrylate resin to be used, the conditions of irradiation, the purpose of cross-linking polymerization, and the rate of the polymerization desired. Such method may be carried out with heating, pressure-adding, agitating and other operations.

The amount of methyl acrylate resin contained in the resin composition of the invention need not be particularly limited, but generally in the range of from 0.5 to 50 percent by weight; it may be determined by considering the optimum amounts of the same resin for dissolving or sufficiently swelling in methyl acrylate, and the optimum proportions of mixing thereof, and consequently such factors as the properties of methyl acrylate resin to be used, the method of mixing and dissolving, the method and conditions of irradiation desired, the purpose of cross-linking polymerization, the degree of the polymerization desired, and economics. Said proportions of mixing can easily be selected in reference to the Examples herein by persons skilled in the art, based on the technical thought of the invention.

The ionizing radiation useful for the cross-linking of the resin composition according to the present invention may be obtained from any one of the sources, including electron beam, neutron beam, alpha-rays, gamma-rays, X-rays, proton beam, and deuteron beam, at doses and dose rates depending on the components and properties of the resin composition used, the method and conditions of irradiation, the purpose of cross-linking polymerization, the degree of the polymerization desired, and economic factors. The desirable radiation dose is generally between $10^3$ and $10^8$ roentgens, with the preferable range from $10^4$ to $10^7$ roentgens.

The ultraviolet rays useful in the process of the invention are electromagnetic waves of from 100 to 4,000 Angstrom units, from any of light sources, such as low-tension, high-tension, and super-high-tension mercury-arc lamps, fluorescence lamps, metal-halide lamps, xenon arc lamps, sodium vapor lamps, and carbon arcs. The wave-length, flux and quantity of light which are most effective to cause cross-linking of the resin compositions according to the invention vary depending on the kinds of the methyl acrylate resins used, the purpose of the cross-linking polymerization, and the degree of the polymerization desired, and should, therefore, be determined in consideration of these as well as economic factors.

It is possible during the cross-linking of the resin composition of the invention under the irradiation of the abovementioned ionizing radiation or ultraviolet rays to remove any stabilizer, inhibitor, other additive, and impurities contained in the methyl acrylate resin and methyl acrylate monomer, so that the irradiation dosage may be lessened. However, according to the present invention, such removal of additives and impurities is not necessarily required.

The inventors previously made an invention relating to a method whereby curing rate could be increased by subjecting a resin composition, which contained an unsaturated polyvinyl ester dissolved in a vinyl monomer, to the irradiation of ionizing radiation in the presence of acetylene (cf. Japanese Patent Application No. 44-11007), and another invention relating to a method whereby cross-linking polymerization under ionizing irradiation could be greatly accelerated by adding a small amount of polydiallyl phthalate to a resin composition which contained a vinyl chloride resin mixed and dissolved in a vinyl monomer (cf. Japanese Patent Application No. 44-76,880).

According to this present invention, the rate of the crosslinking rate can also be increased by irradiating it in the presence of acetylene, a curing- and cross-linking-accelerating substance such as a resin having reactive functional radicals in the molecule of its polydiallyl phthalate content, and an organic or inorganic sensitizating agent.

The acceleration of the cross-linking polymerization according to the present invention in the presence of ionizing radiation may not only be effected by application of heat and pressure, screaning of oxygen, and addition of a catalyzer, but also satisfactorily possible in air at room temperature and under normal pressure.

The resin composition of the invention, when subjected to cross-linking by irradiation of ionizing radiation, may not only be with itself but with a mixture or solution with various additives being exemplified by pigments, dyes, glass fibers, gypsum, wood chips, and resins such as alkyl phenol resin, ester gum, rosin, melamine resin, alkyd resin, and poycarbonate.

When the resin composition of the invention is used as a coating applied, for example, to wood, resin formers, papers, fiber products, and metals and irradiated with ionizing radiation, it will have the following advantages:

1. The polymerization reactions proceed very fast to complete cross-linkage in an extremely short time, and the resulting film has excellent physical and chemical properties.
2. No heating step is required.
3. Addition of catalyzers and curing and cross-linking accelerators can be dispensed with.
4. As time available before curing is long, operational difficulties are cleared.
5. No solvent is wanted.
6. Strong adhesion is obtained by chemical bonding to the substratum.

The resin composition of the invention has a wide range of other uses such as adhesives, and molded articles, having excellent physical and chemical properties, produced by casting it into a suitable mold and irradiating same with ionizing radiation, and also the so-called wood plastics and dressed veneer boards improved in properties by soaking their constituent wood, paper or fiber material with it and irradiating same with ionizing radiation.

As is clear from the foregoing description, the resin composition of the present invention has a very high practical value in the above-mentioned uses with respect to its easy and speedy ability to cross linking by irradiation of ionizing radiation.

The following examples are cited to illustrate the invention. They are not intended to limit it in any manner. Parts are all by weight.

EXAMPLE I 20 parts of a copolymer of methyl acrylate and methyl methacrylate copolymerized in the presence of a radical initiator (resin consisting of methyl acrylate 50 mol percent and methyl methacrylate 50 mol percent) was dissolved in 80 parts of methyl acrylate available from the market. This composition was coated 10-micron thick on a tin-plate sheet. The coating was then irradiated by means of accelerated electron beam from an electron accelerator of resonance transformer type at a dose of 2 Mrad in air at room temperature, to cure into a film having excellent adherence and hardness of about 2H by pencil. After this film was kept immersed in boiling acetone for 30 minutes, a considerable amount of residues was still remaining.

For a comparative purpose, methyl acrylate was coated on a tin-plate sheet with itself and irradiated by means of accelerated electron beam at a dose of 4 Mrad under similar conditions. As a result, it showed merely an increase in viscosity; no hardened film was formed. The viscous film was found readily dissolved in acetone at room temperature.

According to this example, it can be known that the dissolution of the methyl acrylate resin in methyl acrylate serves to greatly increase the rate of cross-linking reactions under irradiation of accelerated electron beam, and improve its resistance to solvents.

EXAMPLE II

The same procedure as in Example I was repeated, with 20 parts of a similar copolymer, 50 parts of methyl acrylate, and 30 parts of vinyl acetate available from the market, to yield a film having excellent adherence and hardness of about 2H by pencil. This film was then immersed in boiling acetone for 30 minutes, resulting in having a considerable amount of residues indissolved.

It should be noted that this test with the use of vinyl acetate led to equally satisfactory results, which is very significant with respect to economics.

then degased and subjected to irradiation with gamma-rays from cobalt 60 source at the doses shown in Table 1. As a result, there was almost no polymerization occuring to the monomers and no cross-links established. From this fact it is known that methyl acrylate is very suitable as a monomer to be used.

Table 1

| Weight of Polymethyl acrylate (g) | Mixing Proportion | | Dose of Irradiation ($\times 10^{-4}$ rad) | Yields (%) | Percent Gelation (%) |
| --- | --- | --- | --- | --- | --- |
| | Monomer | | | | |
| | Kind | Weight (g) | | | |
| Nil | Methyl acrylate | 10.0 | 4.2 | 22 | 15 |
| 1.3 | do. | 8.7 | 4.2 | 56 | 51 |
| 2.0 | do. | 8.0 | 4.2 | 82 | 65 |
| 2.5 | do. | 7.5 | 4.2 | 98 | 87 |
| 4.0 | do. | 6.0 | 4.2 | 100 | 66 |
| 5.0 | do. | 5.0 | 4.2 | 100 | 43 |
| 10.0 | Nil | | 4.2 | 100 | 0 |
| Comparison | | | | | |
| 2.0 | Methyl methacrylate | 8.0 | 4.2 | 23 | 0 |
| 2.0 | Styrene | 8.0 | 67.2 | 25 | 0 |
| 2.0 | Vinyl acetate | 8.0 | 4.2 | 23 | 0 |

EXAMPLE III

Polymethyl acrylate polymerized by a radical initiator was dissolved in methyl acrylate refined by normal processes, in various proportions as shown in Table 1. These solutions were placed in glass ampoules, then degased and irradiated with gammarays from cobalt 60 source at a dose of $4.2 \times 10^4$ rad at 30°C.

Resulting "yields" and "percent gelation" are shown in the same Table 1. Yield means a percentage of solid portions against the total charge in each ampoule, when the volatile matter in the sample has been removed under reduced pressure at room temperature. Percent gelation represents indissolved portions against the whole charge after the sample has been immersed in boiling acetone for 50 hours.

It is thus apparent that when a resin composition consisting of polymethyl acrylate and methyl acrylate is irradiated with gamma-rays, yield percentages sharply increase as the addition of polymethyl acrylate is increased, up to 100 percent with the content of polymethyl acrylate being about 25 percent; and further that percent gelation increases as the contents of polymethyl acrylate increase, up to the maximum with the content of polymethyl acrylate being about 25 percent, and then tends to decrease. This indicates that there should be an optimum proportion for polymethyl acrylate to be mixed and dissolved in the resin composition which is subjected to cross-linking at the rate and degree desired.

It is also known that the cross-linking reaction is induced by reciprocal reactions of polymethyl acrylate and methyl acrylate, in view of the fact that no cross-linking occurred when polymethyl acrylate by itself was irradiated in vacuo, as shown in Table 1.

For a comparative purpose, 2 g of the same polymethyl acrylate as used in the example were mixed and dissolved in 8 g each of methyl acrylate, styrene, and vinyl acetate all refined by ordinary processes. Each of these samples was placed in a glass ampoule, which was

COMPARATIVE EXAMPLE

In addition to the foregoing comparison in which methyl acrylate was referred to its excellent nature of accelerating cross-linking polymerization, this comparative example is intended to show the characteristics of polymethyl acrylate that comprises the resin composition of the present invention.

In said polymethyl acrylate, there were mixed and dissolved radical-initiated polymethyl methacrylate, polystyrene, and polyvinyl acetate, respectively, and irradiated with gamma-rays under the same conditions as in Example III. The resultant yields and percent gelation are given in the following Table 2.

Table 2

| Mixing Proportion in Resin Composition | | | Dose of Irradiation | Yields | % Gelation |
| --- | --- | --- | --- | --- | --- |
| Polymethyl Acrylate (g) | Resin | | | | |
| | Kind | Weight (g) | ($\times 10^{-4}$ rad) | (%) | (%) |
| 8.0 | Polymethyl methacrylate | 2.0 | 4.2 | 63 | 30 |
| 8.0 | Polystyrene | 2.0 | 4.2 | 21 | 6 |
| 8.0 | Polyvinyl acetate | 2.0 | 4.2 | 73 | 53 |

It is known that the above figures of yields and percent gelation are in all samples lower than those shown in Table 1; this may be interpreted as that polymethyl acrylate is a superior substance to be mixed and dissolved in the resin composition for cross-linking polymerization under irradiation of ionizing radiation, compared to polymethyl acrylate, polystyrene, and polyvinyl acetate.

EXAMPLE IV

The same methyl acrylate-methyl methacrylate copolymer as used in Example I was dissolved in methyl acrylate, refined by normal processes. The resin composition with resineous concentration being 30 percent by weight was placed in a glass ampoule and subjected to irradiation of gamma-rays at a dose of $4.2 \times 10^4$ rad under the same conditions as in Example II, with resulting yields 100 percent and percent gelation 69 percent. In a separate test wherein methyl acrylate monomer alone was used, yields and percent gelation were 22 and 15 percent, respectively, as shown in Table 1.

It is thus apparent that an increasing rate of cross-linking polymerization and excellent solvent-resistance of the end product may be attained by mixing and dissolving the copolymer in methyl acrylate.

EXAMPLE V 21.2 parts of polymethyl acrylate obtained by free-radical polymerization were dissolved in 78.8 parts of methyl acrylate distilled and refined by normal processes. This solution was placed in a glass ampoule, and irradiated with ultraviolet rays from a 250 W high-tension mercury arc lamp, 60 cm apart, in $10^{-4}$ mmHg vacuum atmosphere at room temperature for 2 hours. As a result, there was obtained a solid polymer, 98.0 percent against the total charge.

After immersed in boiling acetone for 50 hours, the solid polymer was extracted, to find that 77.7 percent of the total charge were not dissolved.

For comparison, the same methyl acrylate and polymethyl acrylate were, respectively, put in different glass ampoules and subjected to irradiation of ultraviolet rays under the same conditions. The former resulted in yielding a solid polymer 0.7 percent which was completely dissolved in boiling acetone in 1 hour, while the latter polymethyl acrylate irradiated, immersed in boiling acetone for 50 hours, was not dissolved.

This may be interpreted that by means of irradiation with ultraviolet rays polymethyl acrylate dissolved in methyl acrylate will have accelerated rate of cross-linking polymerization and produce a polymer of excellent resistance to solvents.

COMPARATIVE EXAMPLE 26.4 parts of polymethyl methacrylate obtained by free-radical polymerization was dissolved in 73.6 parts of the same methyl acrylate as used in Example V, and subjected to irradiation with ultraviolet rays under the same conditions as in Example V. Thereupon, there was obtained a solid polymer 99.8 percent out of the total charge. This solid polymer was then immersed in boiling acetone for 50 hours, to yield an insoluble portion 6.2 percent of the total charge.

It is, thus, known that while the polymerization of methyl acrylate is accelerated by dissolving polymethyl methacrylate in that and irradiating same with ultraviolet rays, the rate of cross-linking reaction therein is far lower than in the case of polymethyl acrylate dissolved, and that the effect of accelerating cross-linking therein is inferrior to the case of polymethyl acrylate dissolved.

EXAMPLE VI 20 parts of methyl acrylate-methyl methacrylate copolymer obtained by free-radical polymerization (methyl acrylate units 50 mol percent, methyl methacrylate units 50 mol percent) were dissolved in 80 parts of methyl acrylate distilled and refined by normal processes, and taken into a glass ampoule. The solution was then treated with irradiation of ultraviolet rays under the same conditions as in Example V, but for 30 minutes and 2 hours. The solid polymers formed were 75.2 and 100 percent of the total charge for the respective periods of irradiation.

Further, these solid polymers obtained by 30-minute and 2-hour irradiation were immersed in boiling acetone for 50 hours, and thereupon the ratios of indissolubility were 29.0 and 74.5 percent, respectively.

Apart from the above, a copolymer of methyl acrylate and methyl methacrylate alone was irradiated with ultraviolet rays under the same conditions for 2 hours. The resulting product was totally soluble in boiling acetone in 50 hours.

It is thus known that as irradiation periods are prolonged, cross-linking polymerization proceeds and chemical resistance of the polymer products increases. Moreover, in the case of methyl acrylate alone irradiated as in Example V and also in the Comparative Example attached to the same Example, it is possible to accelerate ultraviolet-irradiation cross-linking polymerization by dissolving the methyl acrylate copolymer in the methyl acrylate, and to increase chemical resistance of the polymer products.

COMPARATIVE EXAMPLE

Methyl methacrylate distilled and refined by normal processes was irradiated with ultraviolet rays under the same procedures as in Example VI for 2 hours, to yield a solid polymer 99 percent of the total charge. The solid polymer was then immersed in boiling acetone for 50 hours, thereafter to find the ratio of its indissolubility against the total charge to be 0.5 percent (accordingly, the dissolubility ratio was 99.5 percent).

Next, in 80 parts of the same methyl methacrylate was dissolved 20 parts of the same copolymer of methyl acrylate and methyl methacrylate as used in Example VI, and irradiated with ultraviolet rays under similar conditions for 2 hours. Thereupon, there was obtained a solid polymer 97.7 percent of the total charge. Upon immersing it in boiling acetone for 50 hours, the indissoluble ratio was 0.2 percent against the total charge.

EXAMPLE VII 20 parts of the copolymer as used in Example VI was dissolved in a mixture of 60 parts of refined methyl acrylate and 20 parts of refined vinyl acetate. The solution was irradiated with ultraviolet rays for 2 hours under the same procedures and conditions as in Example VI. As a result, a solid polymer was formed 100 percent against the total charge. Further, upon immersing the solid polymer in boiling acetone for 50 hours, its indissolubility ratio was found to be 70 percent.

It has now been observed through Examples V, VI, and VII and Comparative Example to Example V that the resin composition in which polymethyl acrylate or a methyl acrylate copolymer was dissolved in methyl acrylate is excellent in capability of cross-linking under irradiation of ultraviolet.

What is claimed is:

1. A process of preparing a cross-linked resin composition which comprises irradiating with ionizing radiation a cross-linkable composition consisting essentially of methyl acrylate monomer and polymethyl acrylate and being devoid of a catalyst or cross-linking agent, said polymethyl acrylate constituting at least 0.5 percent by weight of the composition.

2. A process as claimed in claim 1, wherein the source for the ionizing radiation is radiation from electron beam, neutron beam, alpha rays, gamma-rays, X-rays, proton beam or deuteron beam.

3. A process as claimed in claim 1, wherein said cross-linkable composition is irradiated with ultraviolet rays having electromagnetic waves of from 100 to 4,000 Angstrom units.

4. A process as claimed in claim 1, wherein the composition contains polymethyl acrylate in an amount of between about 0.5 to 50 percent by weight.

5. A process of preparing a cross-linked resin composition which comprises irradiating with ionizing radiation a cross-linkable composition consisting essentially of a monomeric component and a polymeric component, said monomeric component consisting essentially of methyl acrylate and a vinyl monomer selected from the group consisting of vinyl acetate, ethyl acrylate, alkyl methacrylate, acrylonitrile and mixtures thereof, said polymeric component essentially consisting of methyl acrylate copolymer containing at least 1 mole per cent of methyl acrylate units, said polymeric component constituting at least 0.5 percent by weight of the composition, said cross-linkable composition being devoid of a catalyst or cross-linking agent.

6. A process as claimed in claim 5, wherein the source for the ionizing radiation is radiation from electron beam, neutron beam, alpha-rays, gamma-rays, proton beam or deuteron beam.

7. A process as claimed in claim 5, wherein the ionizing radiation is applied at a dose of from $10^3$ to $10^8$ roentgens.

8. A process as claimed in claim 5, wherein said cross-linkable composition is irradiated with ultraviolet rays having electromagnetic waves of from 100 to 4,000 Angstrom units.

9. A process as claimed in claim 5, wherein said polymeric component constitutes between about 0.5 – 50 percent by weight of the composition.

10. A process as claimed in claim 5, wherein said polymeric component contains at least 10 mole percent of methyl acrylate units.

11. A process as claimed in claim 5, wherein the ionizing radiation is applied at a dose of from $10^4$ to $10^7$ roentgens.

12. A process as claimed in claim 1, wherein the ionizing radiation is applied at a dose of from $10^4$ to $10^7$ roentgens.

13. A process of preparing a cross-linked resin composition which comprises irradiating with ionizing radiation a cross-linkable composition consisting essentially of methyl acrylate monomer and polymethyl acrylate and being devoid of a catalyst or cross-linking agent, said polymethyl acrylate constituting between about 13–50 percent by weight of the composition, said irradiation being carried out at a dose rate and a dose at which the desired cross-linking takes place.

* * * * *